(12) United States Patent
Sullivan et al.

(10) Patent No.: US 7,036,636 B2
(45) Date of Patent: May 2, 2006

(54) PORTABLE SCAFFOLD BRAKE

(75) Inventors: Patrick W. Sullivan, Madison, WI (US); Jerome M. Sullivan, Middleton, WI (US); Randall J. Kohlhardt, Madison, WI (US)

(73) Assignee: Sullivan Bros. Supply, Inc., Madison, WI (US)

( * ) Notice: Subject to any disclaimer, the term of this patent is extended or adjusted under 35 U.S.C. 154(b) by 159 days.

(21) Appl. No.: 10/329,736

(22) Filed: Dec. 26, 2002

(65) Prior Publication Data

US 2004/0124039 A1    Jul. 1, 2004

(51) Int. Cl.
*B60T 1/14*    (2006.01)

(52) U.S. Cl. .............................. 188/5; 188/19; 188/23

(58) Field of Classification Search ................ 188/23, 188/19, 5
See application file for complete search history.

(56) References Cited

U.S. PATENT DOCUMENTS

| | | | |
|---|---|---|---|
| 1,258,318 A * | 3/1918 | Corkran | 188/5 |
| 1,701,951 A * | 2/1929 | Holt | 182/15 |
| 1,747,972 A | 2/1930 | Feldmann | |
| 1,950,261 A * | 3/1934 | Nemours et al. | 188/5 |
| 2,185,073 A * | 12/1939 | Chamberlain | 188/5 |
| 2,630,961 A * | 3/1953 | Burg | 182/15 |
| 2,631,692 A * | 3/1953 | Leslie | 188/5 |
| 2,712,366 A | 7/1955 | Skupas | |
| 2,851,126 A * | 9/1958 | Ward, Jr. | 188/5 |
| 2,980,200 A * | 4/1961 | Kibby | 182/16 |
| 2,987,297 A | 6/1961 | Bohn | |
| 3,288,250 A | 11/1966 | Oja et al. | |
| 3,715,015 A * | 2/1973 | Morris | 188/5 |
| 3,763,966 A * | 10/1973 | Close | 188/5 |
| 3,997,024 A | 12/1976 | Fredricks et al. | |
| 4,302,025 A * | 11/1981 | Waddell et al. | 280/79.11 |
| 4,655,466 A | 4/1987 | Hanaoka | |
| 4,807,719 A | 2/1989 | Burkstrand et al. | |
| 5,431,254 A * | 7/1995 | Kramer et al. | 188/7 |
| 6,105,731 A * | 8/2000 | Du Rees | 188/2 F |

* cited by examiner

*Primary Examiner*—Robert A. Siconolfi
(74) *Attorney, Agent, or Firm*—Jeffrey D. Peterson; Michael Best & Friedrich LLP (57) ABSTRACT

The portable brake of the present invention comprises a top bracket, a bottom bracket, a leg, a handle, a toggle plate, and a foot. The top bracket of the portable brake has a back plate, side plates, a bottom plate, a toggle joint, a rung hook, and a leg sheath. The bottom bracket comprises a back plate, side plates, a bottom plate, a rung hook, and a leg sheath. The top and bottom brackets secure a leg, which passes through the leg sheaths of the brackets and leg apertures in the bottom plates of the brackets. A toggle plate is connected at one end to the top of the leg, and is connected at the other end to a pair of hinge plates. The hinge plates are, in turn, connected to a handle and to the toggle joint of the top bracket.

19 Claims, 11 Drawing Sheets

PORTABLE SCAFFOLD BRAKE

This invention relates to a portable brake for a wheeled scaffold.

Wheeled scaffolds are commonly used in construction. A problem with such scaffolding is the unintentioned movement of the scaffold. Currently, existing brakes for the castor wheels of such scaffolds are located on the wheels themselves. This requires an individual to lock the wheels from the ground before climbing the scaffold. A braking device is needed that can be locked and released by an individual positioned on the top of a scaffold.

The present invention provides a portable brake for wheeled scaffolding which can be easily assembled and fitted to scaffolds of various sizes and types. The brake of the present invention can be locked and released by an individual positioned at the top of the scaffolding.

SUMMARY OF INVENTION

The present invention provides a portable brake which, suitably, can be attached to a wheeled scaffold.

In one embodiment, the portable brake comprises a top bracket, a bottom bracket, a leg, a handle, a toggle plate, and a foot. The top bracket comprises a back plate, side plates, a bottom plate, a toggle joint, a rung hook, and a leg sheath. The bottom bracket comprises a back plate, side plates, a bottom plate, a rung hook, and a leg sheath. The top and bottom brackets secure a leg, which passes through the leg sheaths of the brackets and leg apertures in the bottom plates of the brackets. A toggle plate is connected at one end to the top of the leg, and is connected at the other end to a pair of hinge plates. The hinge plates are, in turn, connected to a handle and to the toggle joint of the top bracket. The foot, comprising a base plate and at least one vibration minimizing pad, is connected to the bottom of the leg.

In another embodiment, the portable brake of the present invention comprises a top bracket, a bottom bracket, a leg, a handle, a toggle plate, and a foot. The top bracket comprises a back plate, side plates, a bottom plate, a toggle joint, a rung hook, and a leg sheath. The bottom bracket comprises a back plate, side plates, a bottom plate, a rung hook, and a leg sheath. The leg of the brake comprises a connecting rod and a leg sleeve. The connecting rod is received by the leg sleeve. The leg sleeve is secured by passing through the leg sheath of the bottom bracket and a leg aperture in the bottom plate of the bottom bracket. The connecting rod is secured by passing through the leg sheath of the top bracket and a leg aperture in the bottom plate of the top bracket. A toggle plate is connected at one end to the top of the connecting rod, and is connected at the other end to a pair of hinge plates. The hinge plates are, in turn, connected to a handle and to the toggle joint of the top bracket. The foot, comprising a base plate and at least one vibration minimizing pad, is connected to the bottom of the leg sleeve.

A compression spring is fitted around the connecting rod, and a compression spring stopper is located on the connecting rod, such that the compression spring exerts pressure on the leg sleeve and the compression spring stopper. The connecting rod can contain numerous pin apertures to allow for the compression spring stopper to be placed in various positions. The compression spring stopper position is secured by a pin passing through a selected aperture. The connecting rod also contains at least one lifting bolt aperture located near the bottom of the connecting rod. The leg sleeve, in turn, contains access apertures near the bottom end. A lifting bolt passes through a lifting bolt aperture of the connecting rod and the access slots of the leg sleeve.

In another embodiment of the invention, the portable brake comprises a top bracket, a bottom bracket, a leg, a handle, a toggle plate, and a foot. The top bracket comprises a back plate, side plates, a bottom plate, a toggle joint, a rung hook, and a leg sheath. The bottom bracket comprises a back plate, side plates, a bottom plate, a rung hook, and a leg sheath. The leg of the brake comprises a first connecting rod, a second connecting rod and a leg sleeve. The bottom of the first connecting rod is attached to the top of the second connecting rod. The second connecting rod is received by the leg sleeve. The leg sleeve is secured by passing through the leg sheath of the bottom bracket and a leg aperture in the bottom plate of the bottom bracket. The first connecting rod is secured by passing through the leg sheath of the top bracket and a leg aperture in the bottom plate of the top bracket. A toggle plate is connected at one end to the top of the first connecting rod, and is connected at the other end to a pair of hinge plates. The hinge plates are, in turn, connected to a handle and to the toggle joint of the top bracket. The foot, comprising a base plate and at least one vibration minimizing pad, is connected to the bottom of the leg sleeve.

A compression spring is fitted around the first connecting rod, and a compression spring stopper is located on the first connecting rod, such that the compression spring exerts pressure on the leg sleeve and the compression spring stopper. The first connecting rod can contain numerous pin apertures to allow for the compression spring stopper to be placed in various positions. The compression spring stopper is secured by a pin passing through a selected aperture. The second connecting rod also contains at least one lifting bolt aperture located near the bottom of the second connecting rod. The leg sleeve, in turn, contains access apertures near the bottom end. A lifting bolt passes through a lifting bolt aperture of the second connecting rod and the access slots of the leg sleeve.

The present invention also provides a portable brake kit comprising a top bracket, a bottom bracket, a leg, a handle, a toggle plate, a compression spring, a compression spring stopper, and a foot. The top bracket comprises a back plate, side plates, a bottom plate, a toggle joint, a rung hook, and a leg sheath. The bottom bracket comprises a back plate, side plates, a bottom plate, a rung hook, and a leg sheath. The leg of the brake comprises a connecting rod and a leg sleeve. The foot comprises a base plate and at least one vibration minimizing pad.

The present invention also provides a scaffold brake system comprising a scaffold end having multiple horizontal rungs, a top bracket, a bottom bracket, a leg, a handle, a toggle plate, and a foot.

The top bracket comprises a back plate, side plates, a bottom plate, a toggle joint, a rung hook, and a leg sheath, wherein the back plate has at least one mounting aperture. The bottom bracket comprises a back plate, side plates, a bottom plate, a rung hook, and a leg sheath, wherein the back plate has at least one mounting aperture.

The top bracket is secured to the scaffold end by the top bracket rung hook being positioned on a horizontal rung of the scaffold end, and a top bracket mounting bolt securing the top bracket to another horizontal rung. The top bracket mounting bolt passes through a top bracket mounting aperture.

The bottom bracket is secured to the scaffold end by the bottom bracket rung hook being positioned on a horizontal rung of the scaffold end, and a bottom bracket mounting bolt securing the bottom bracket to another horizontal rung, wherein the bottom bracket mounting bolt passes through a bottom bracket mounting aperture.

The leg of the brake comprises a connecting rod and a leg sleeve. The connecting rod is received by the leg sleeve. The leg sleeve is secured by passing through the leg sheath of the bottom bracket and a leg aperture in the bottom plate of the bottom bracket. The connecting rod is secured by passing through the leg sheath of the top bracket and a leg aperture in the bottom plate of the top bracket. A toggle plate is connected at one end to the top of the connecting rod, and is connected at the other end to a pair of hinge plates. The hinge plates are, in turn, connected to a handle and to the toggle joint of the top bracket. The foot, comprising a base plate and at least one vibration minimizing pad, is connected to the bottom of the leg sleeve.

A compression spring is fitted around the connecting rod, and a compression spring stopper is located on the connecting rod, such that the compression spring exerts pressure on the leg sleeve and the compression spring stopper. The connecting rod can contain numerous pin apertures to allow for the compression spring stopper to be placed in various positions. The compression spring stopper is secured by a pin passing through a selected aperture. The connecting rod also contains at least one lifting bolt aperture located near the bottom of the connecting rod. The leg sleeve, in turn, contains access apertures near the bottom end. A lifting bolt passes through a lifting bolt aperture of the connecting rod and the access slots of the leg sleeve.

When the handle of the portable brake is rotated partially in a particular direction, the toggle plate forces the connecting rod downward, and the toggle joint locks into place. The compression spring stopper of the connecting rod, in turn, applies downward pressure on the compression spring, which applies downward pressure on the leg sleeve. The foot of leg sleeve secures the brake to the ground by friction force. When the handle is rotated partially in the opposite direction, the toggle plate raises the connecting rod. The lifting bolt attached to the connecting rod raises the leg sleeve by the point of contact at the top of the access slots of the leg sleeve.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof.

DETAILED DESCRIPTION

This invention relates to a portable brake for a wheeled scaffold. The present invention is suitably designed for use with existing scaffolds of various sizes. The scaffold brake can be constructed out of any durable material, suitably steel.

Figure 1:
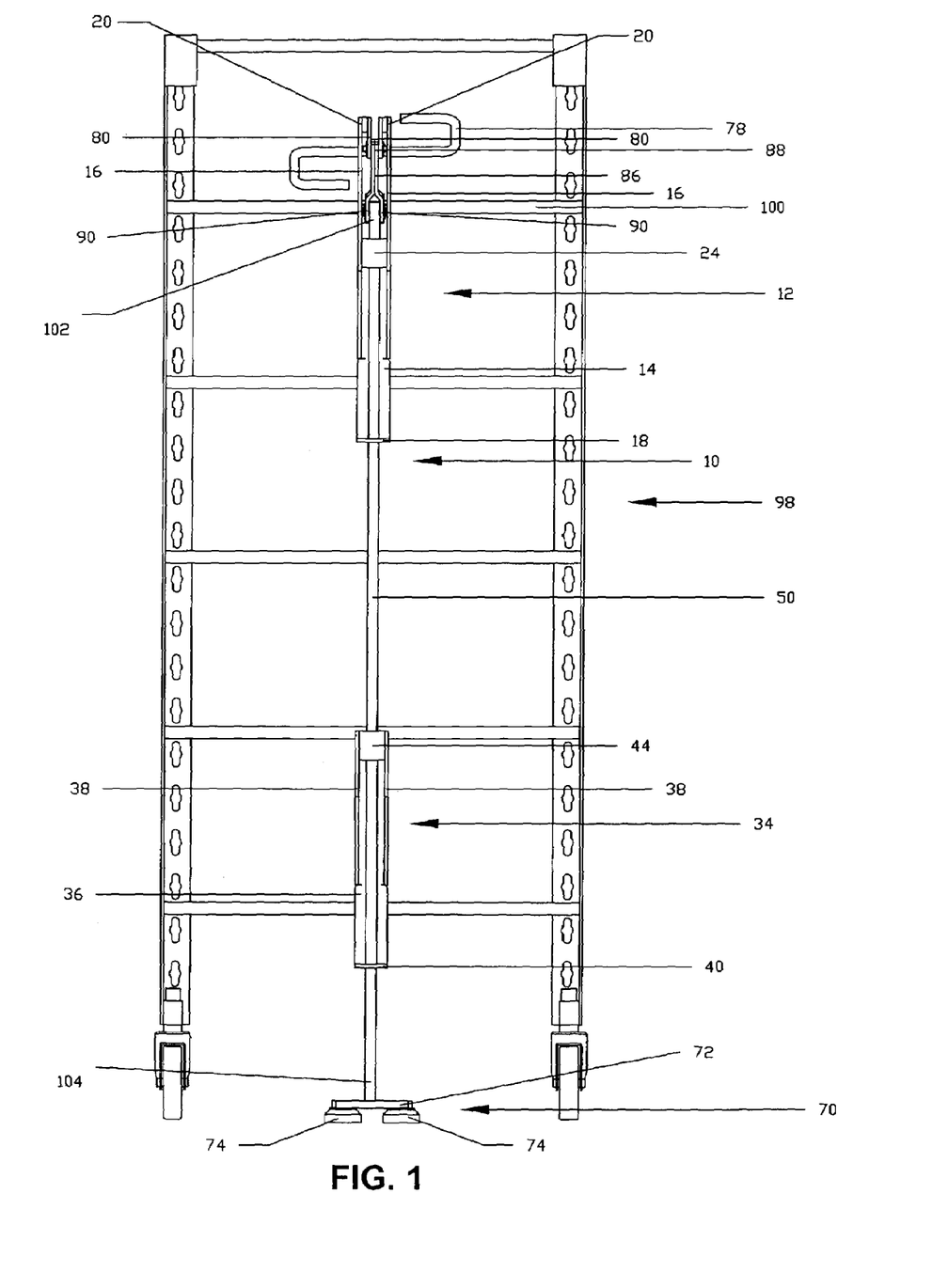
FIG. 1 is a front view of one embodiment of the scaffold brake of the present invention.
Figure 2:
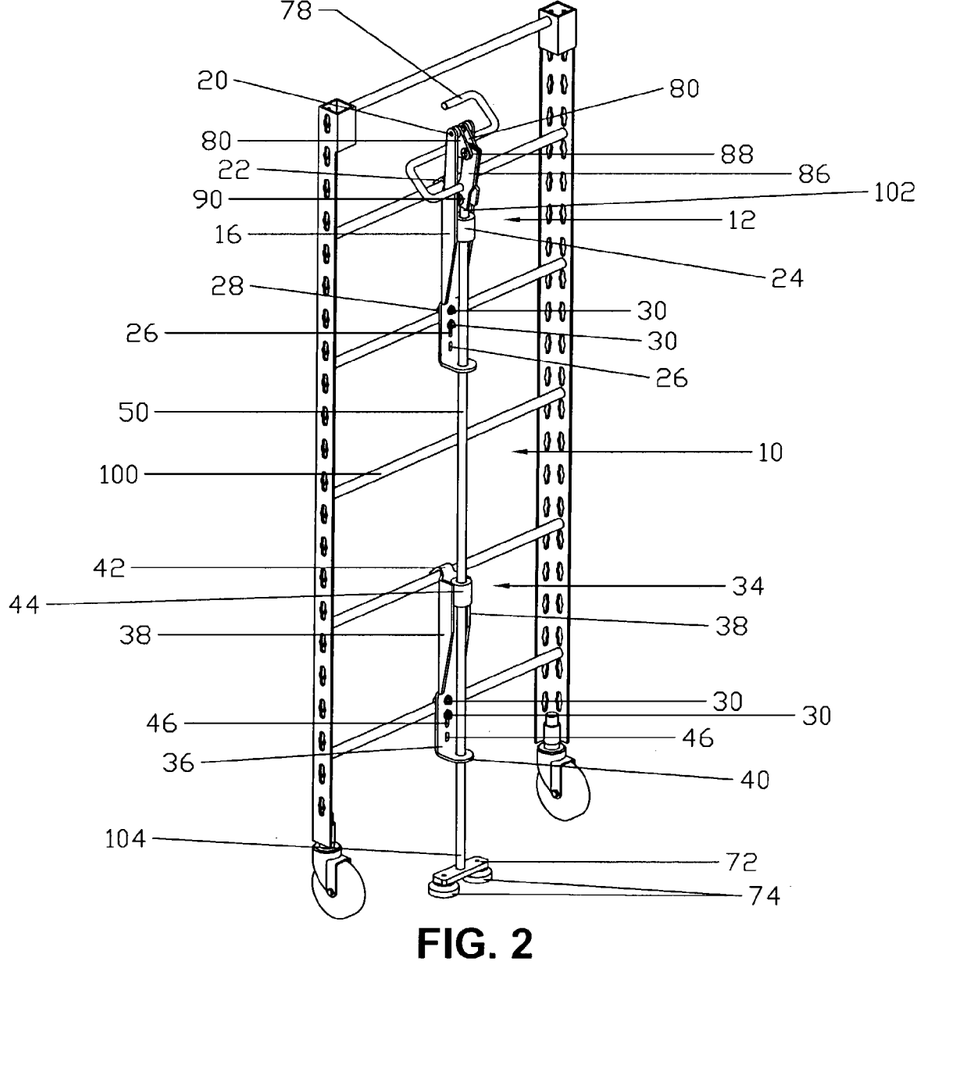
FIG. 2 is a perspective view of one embodiment of the scaffold brake of the present invention.

One embodiment of the scaffold brake of the present invention is shown in FIGS. 1 and 2. The portable scaffold brake 10 comprises a top bracket 12 (FIGS. 13–15), a bottom bracket 34 (FIGS. 16–18), a leg 50, a handle 78 and hinge plates 80 (FIGS. 6–8), a toggle plate 86 (shown in FIG. 9), and a foot 70.

Figure 13:
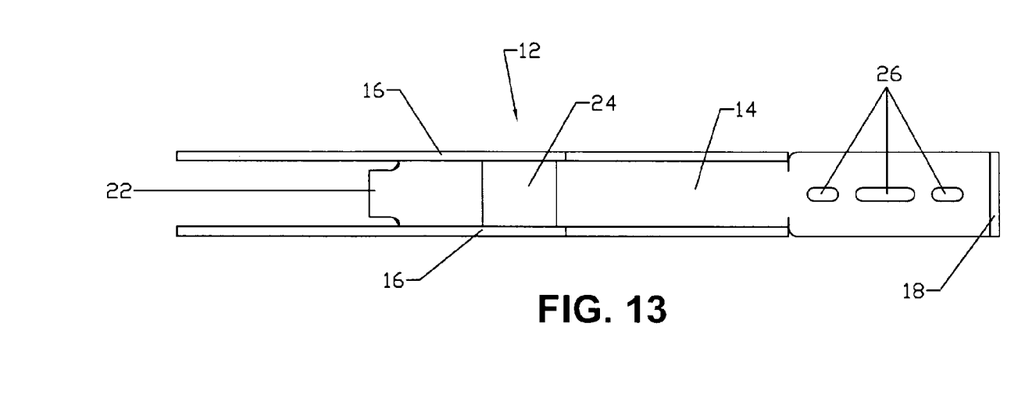
FIG. 13 is a top view of the top bracket of the present invention.
Figure 14:
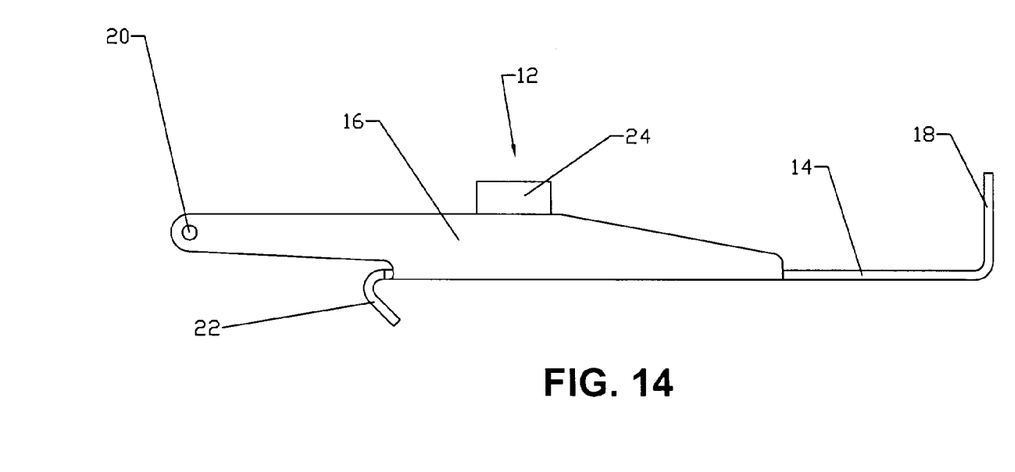
FIG. 14 is a side view of the top bracket of the present invention.
Figure 15:
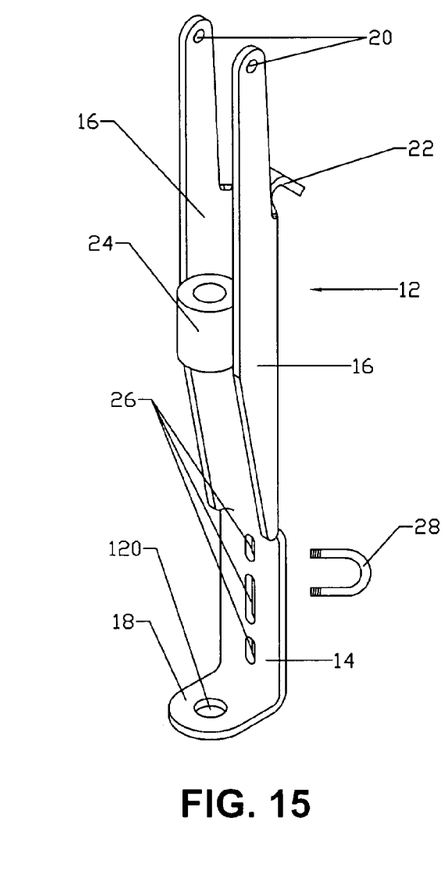
FIG. 15 is a perspective view of the top bracket of the present invention.

The top bracket 12 comprises a back plate 14, side plates 16, a rung hook 22, a leg sheath 24, a toggle joint 20 and a bottom plate 18. The rung hook 22 of the top bracket 12 is hung on one of the horizontal rungs 100 of the scaffold end 98. The back plate 14 of the top bracket 12 is secured to another rung 100 of the scaffold end 98 via a mounting bolt 28 which passes through mounting apertures 26, which are on the back plate 14 of the top bracket 12. The mounting bolt 28 passes through at least one of the mounting apertures 26 and can be secured with various fasteners such as a nut or a pin and washer. The bottom plate 18 of the top bracket 12 has a leg aperture 120.

Figure 16:
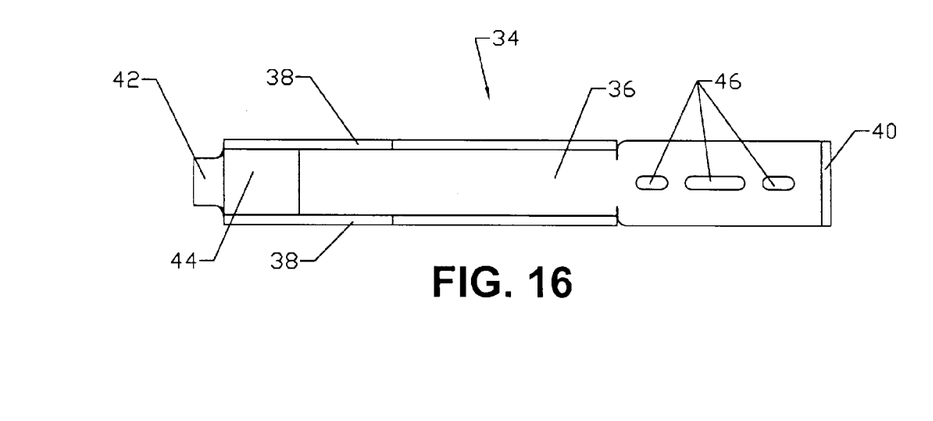
FIG. 16 is a top view of the bottom bracket of the present invention.
Figure 17:
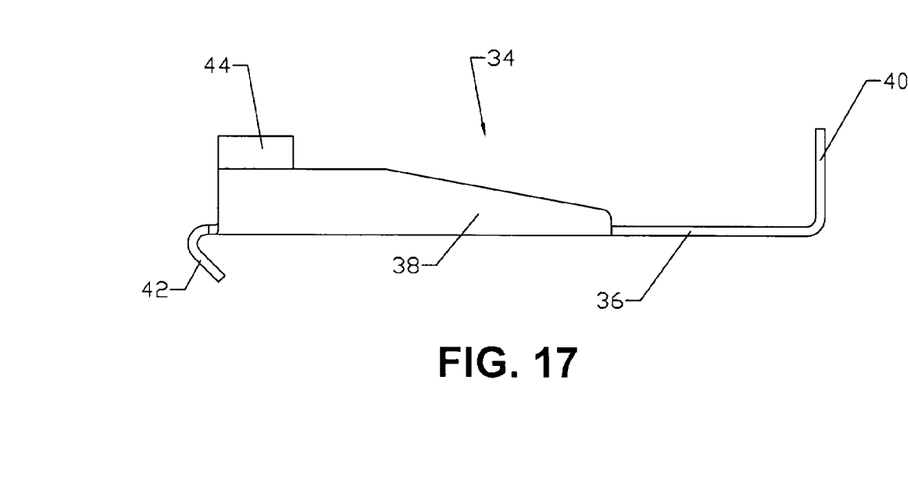
FIG. 17 is a side view of the bottom bracket of the present invention.
Figure 18:
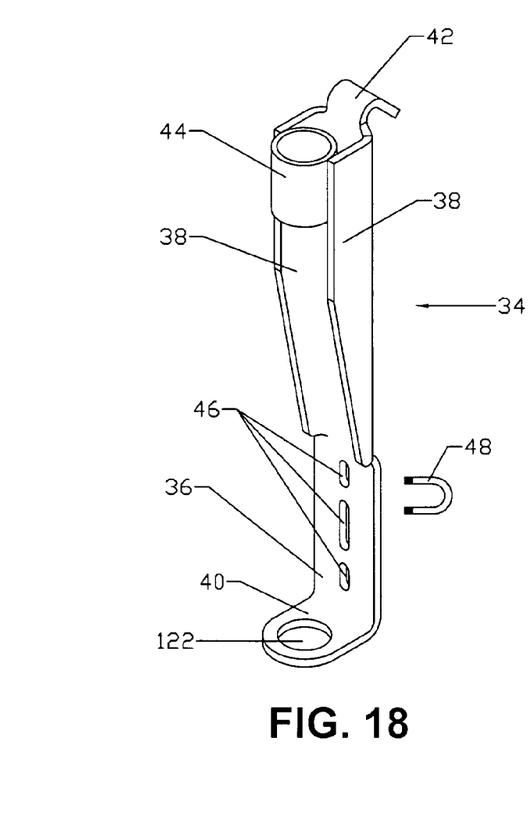
FIG. 18 is a perspective view of the bottom bracket of the present invention.

The bottom bracket 34 comprises a back plate 36, side plates 38, a rung hook 42, a leg sheath 44, and a bottom plate 40. The rung hook 42 of the bottom bracket 34 is hung on one of the horizontal rungs 100 of the scaffold end 98. The back plate 36 of the bottom bracket 34 is secured to another rung 100 of the scaffold end 98 via a mounting bolt 48 which passes through mounting apertures 46 which are on the back plate 36 of the bottom bracket 34. The mounting bolt 48 passes through at least one of the mounting apertures 46 and can be secured with various fasteners such as a nut or a pin and washer. The bottom plate 40 of the bottom bracket 34 has a leg aperture 122.

Figure 6:
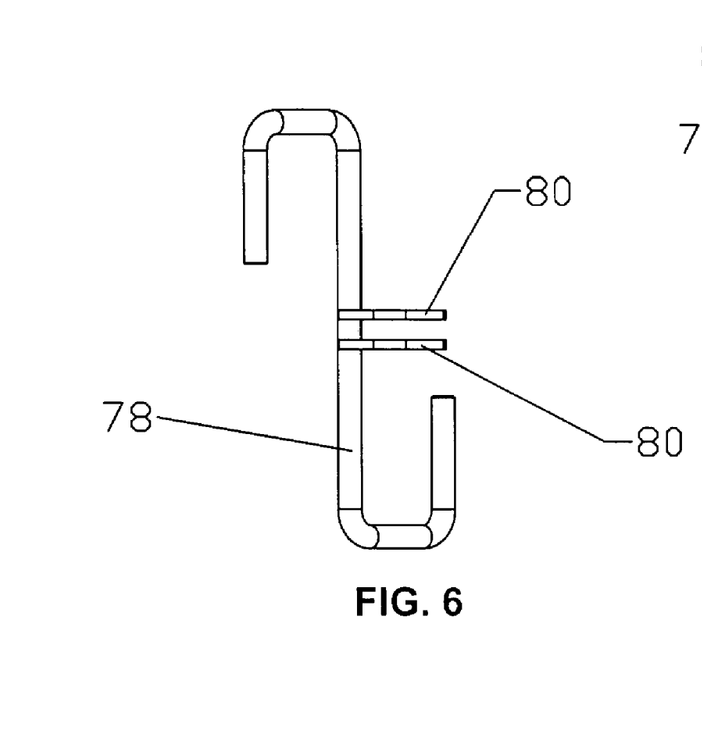
FIG. 6 is top view of the handle and hinge plates of the present invention.
Figure 7:
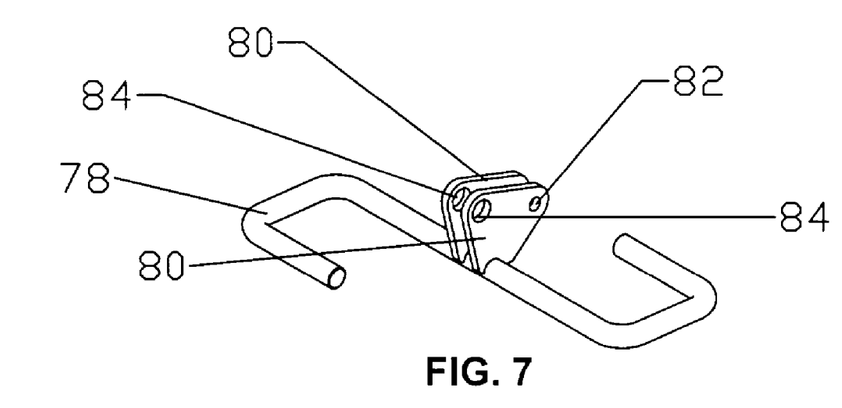
FIG. 7 is a perspective of the handle and hinge plates of the present invention.
Figure 8:
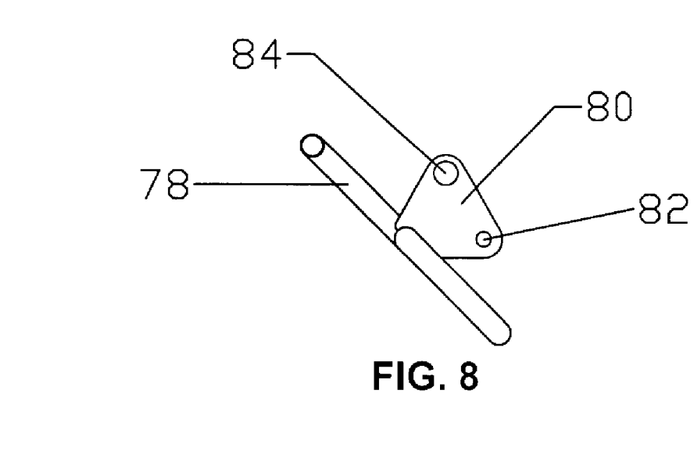
FIG. 8 is a side view of the handle and hinge plates of the present invention.
Figure 9:
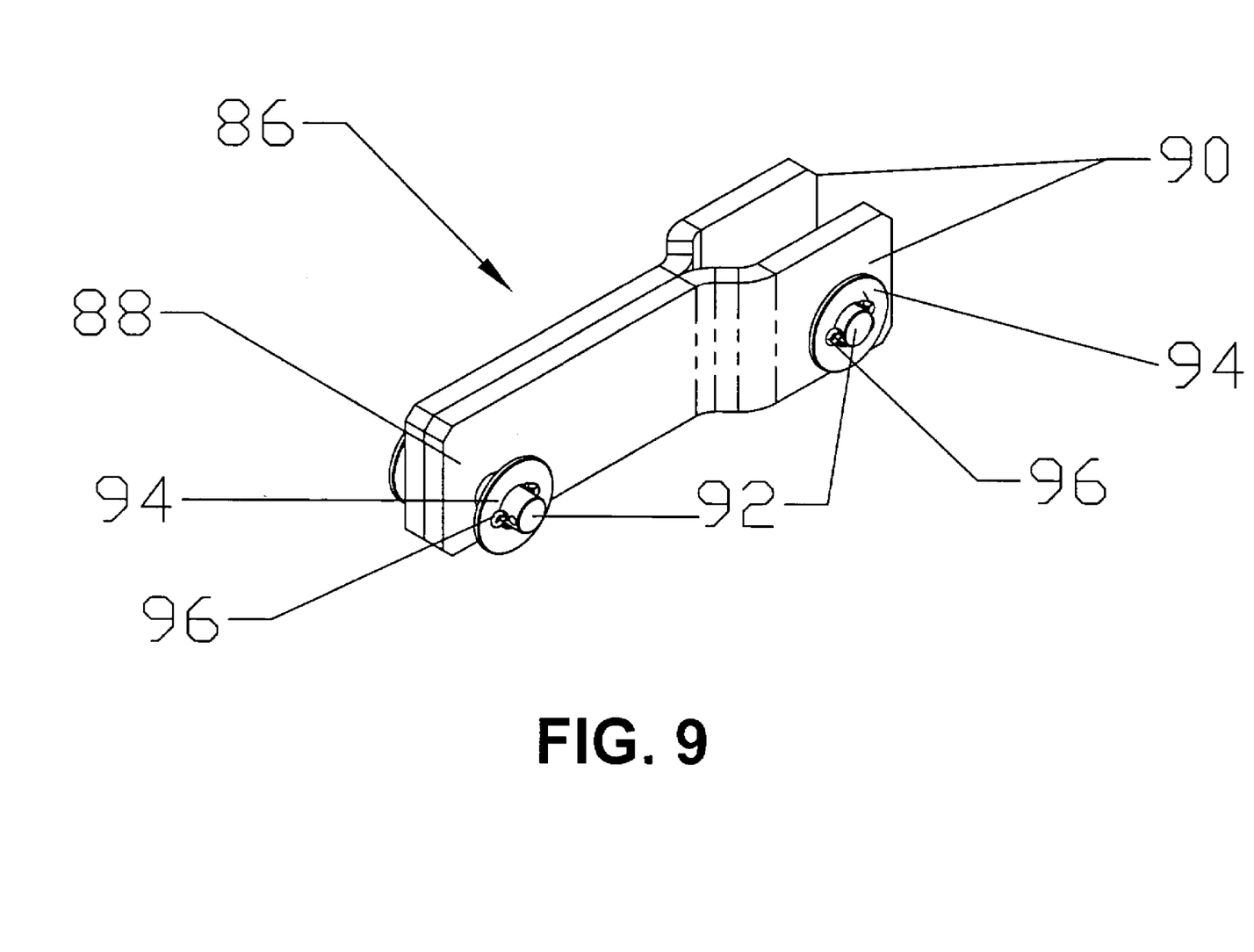
FIG. 9 is a perspective view of the toggle plate of the present invention.

The portable scaffold (FIGS. 1–2) further comprises a leg 50 which suitably consists of a long rod having a top end 102 and a bottom end 104. The leg 50 passes through the top bracket leg sheath 24, top bracket leg aperture 120, bottom bracket leg sheath 44 and bottom bracket leg aperture 122. The top of the leg 102 is connected to the bottom 90 of the toggle plate 86 (FIG. 9). The connection suitably is done via a bolt 92 which passes through an aperture in the bottom 90 of the toggle plate 86 and the top 102 of the leg 50. The top 88 of the toggle plate 86 is connected to one corner of the hinge plate 80 (FIGS. 6–8). The toggle plate 86 is suitably connected to the hinge plates 80 via a bolt 92, which passes through an aperture 84 in the hinge plate and an aperture in the top 88 of the toggle plate 86. Bolt 92 can, among other ways, be secured via a pin 96 and washer 94. Another corner of the hinge plate 80 is connected to the toggle joint 20 of the top bracket 12. The hinge plate 80 is suitably connected to the toggle joint 20 via a bolt which passes through the aperture 82 and an aperture in the toggle joint 20 and can be secured via a pin and washer, among other ways. A handle 78 is connected to one of the corners of the hinge plates 80.

A foot 70, comprising a base plate 72 and vibration minimizing pads 74, is attached to the bottom 104 of the leg 50. The vibration minimizing pads 74 suitably may be made of any rubber material. As the handle 78 is rotated around the toggle joint 20, the toggle plate 86 exerts pressure downward or upward, depending on the rotation of the handle 78. If the rotation of the handle exerts pressure downward, the leg 50 is forced downward and the vibration minimizing pads 74 are pressed into the ground to provide friction braking, preventing movement of the scaffold end 98.

Figure 3:
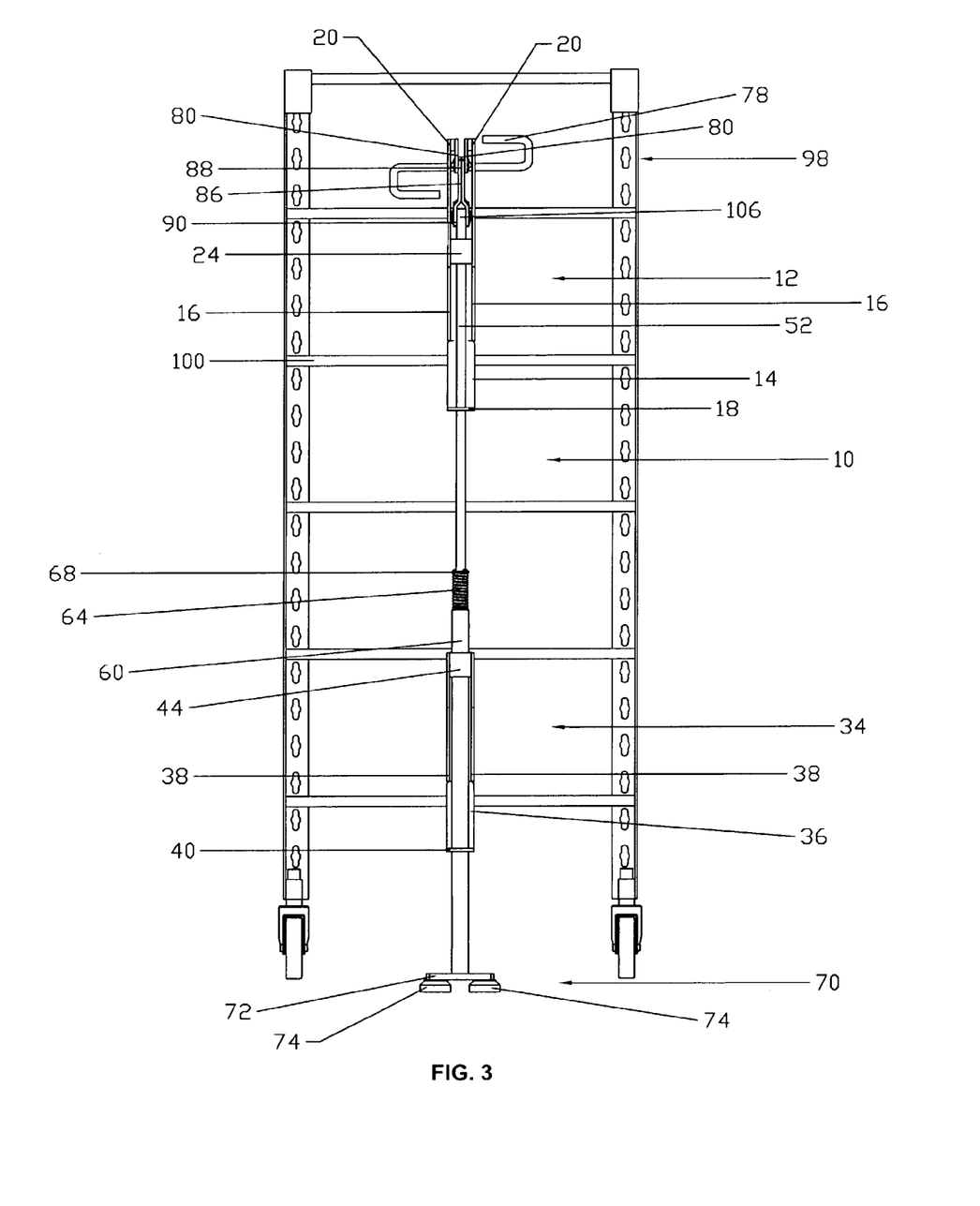
FIG. 3 is a front view of one embodiment of the scaffold brake of the present invention.
Figure 4:
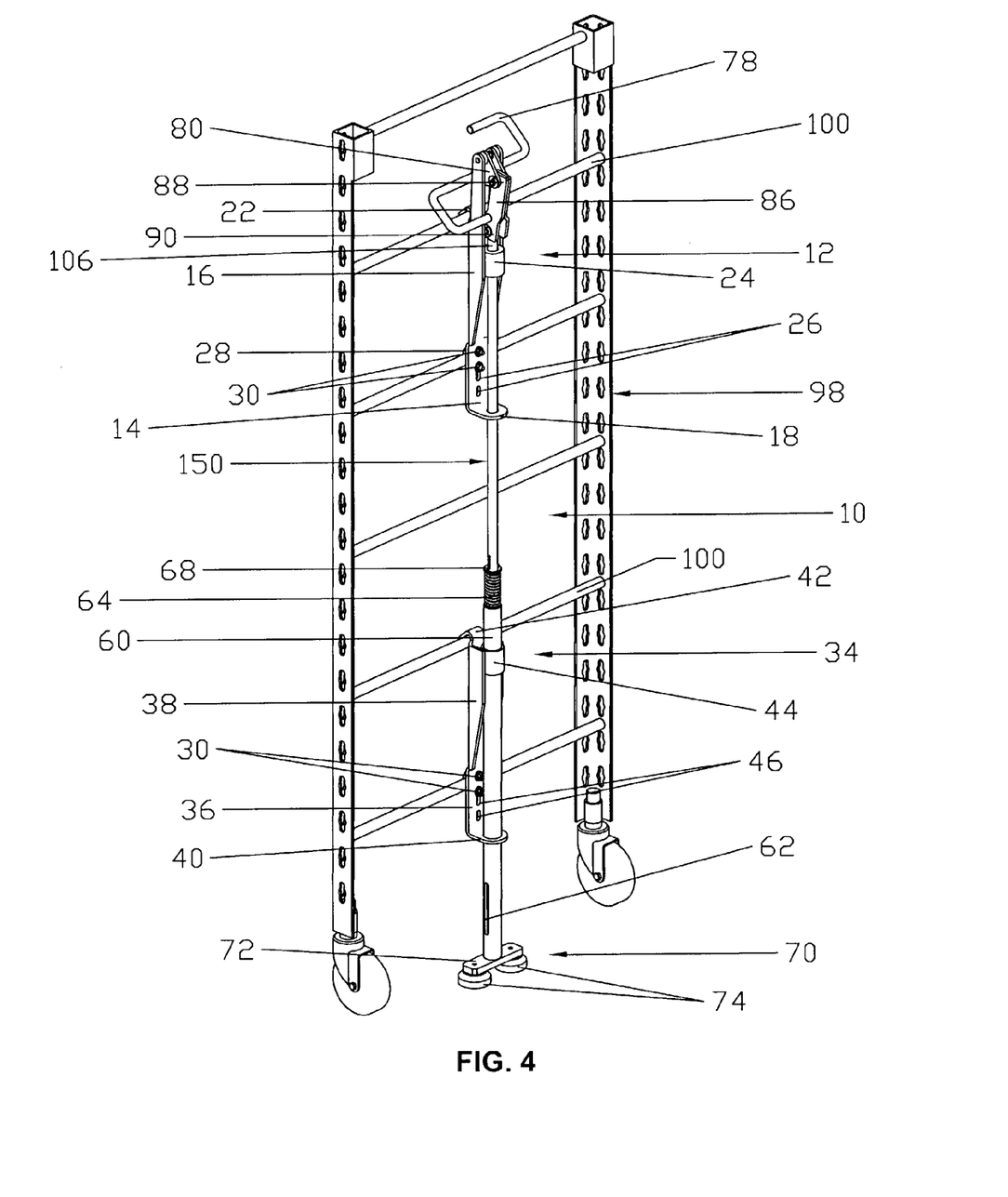
FIG. 4 is a perspective view of one embodiment of the scaffold brake of the present invention.
Figure 5:
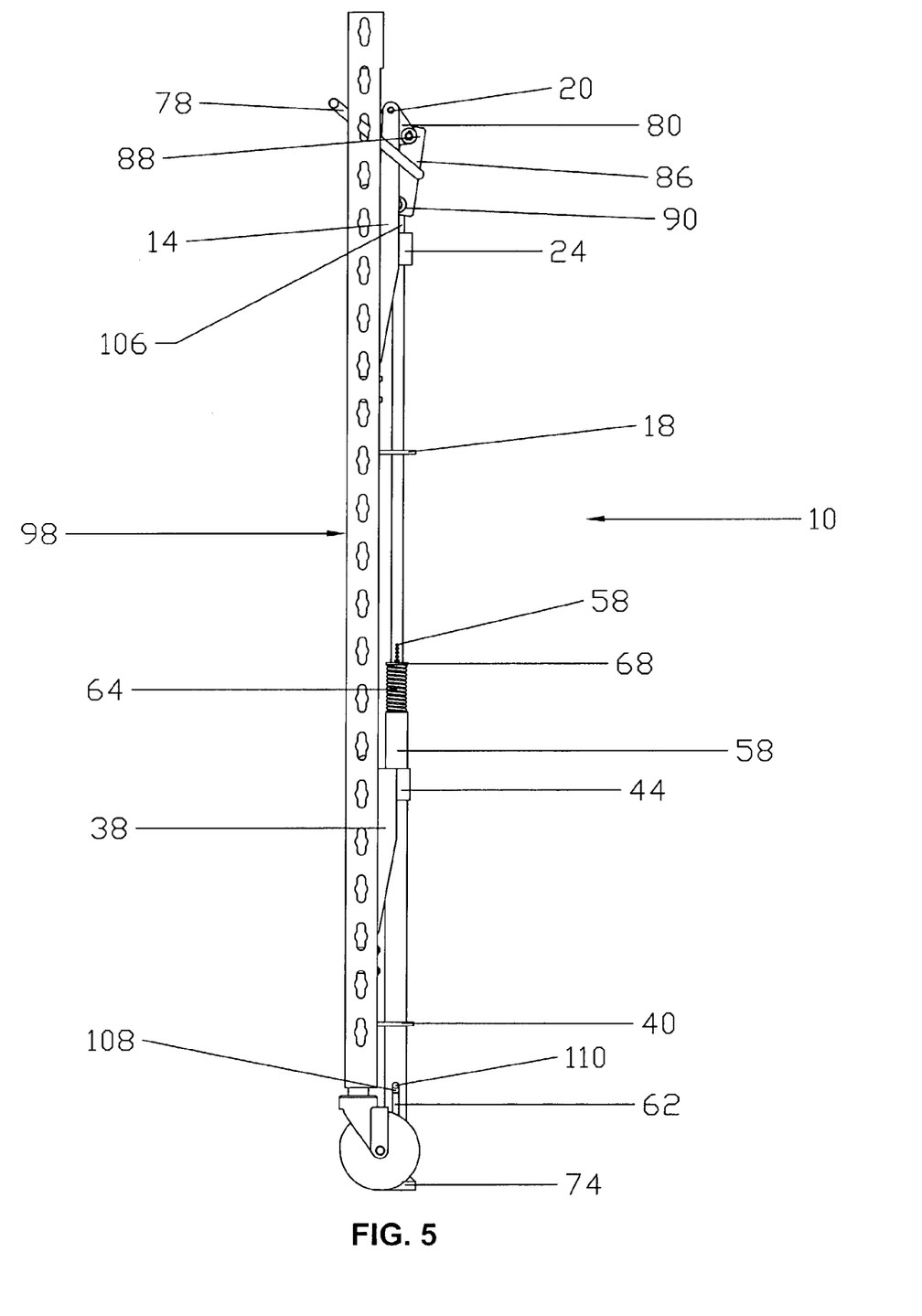
FIG. 5 is a side view of one embodiment of the scaffold brake of the present invention.

Another embodiment of the invention is shown in FIGS. 3–5. In this embodiment, the portable scaffold brake comprises: a top bracket 12 (FIGS. 13–15), a bottom bracket 34 (FIGS. 16–18), a leg 150 (FIGS. 10–11), a handle 78 and hinge plates 80 (FIGS. 6–8), a toggle plate 86 (shown in FIG. 9), and a foot 70.

The top bracket 12 comprises a back plate 14, side plates 16, a rung hook 22, a leg sheath 24, a toggle joint 20 and a bottom plate 18. The rung hook 22 of the top bracket 12 is hung on one of the horizontal rungs 100 of the scaffold end 98. The back plate 14 of the top bracket 12 is secured to another rung 100 of the scaffold end 98 via a mounting bolt 28, which passes through mounting apertures 26, which are on the back plate 14 of the top bracket 12. The mounting bolt 28 passes through at least one of the mounting apertures 26 and can be secured with various fasteners such as a nut or a pin and washer. The bottom plate 18 of the top bracket 12 has a leg aperture 120.

The bottom bracket 34 comprises a back plate 36, side plates 38, a rung hook 42, a leg sheath 44, and a bottom plate 40. The rung hook 42 of the bottom bracket 34 is hung on one of the horizontal rungs 100 of the scaffold end 98. The back plate 36 of the bottom bracket 34 is secured to another rung 100 of the scaffold end 98 via a mounting bolt 48, which passes through mounting apertures 46, which are on the back plate 36 of the bottom bracket 34. The mounting bolt 48 passes through at least one of the mounting apertures 46 and can be secured with various fasteners such as a nut or a pin and washer. The bottom plate 40 of the bottom bracket 34 has a leg aperture 122.

The portable scaffold brake 10 (FIGS. 3–5) further comprises a leg 150 (FIGS. 10–11), which comprises a connecting rod 52 and a leg sleeve 60. The connecting rod 52 has a top end 106 and bottom end 108. The connecting rod is secured to the top bracket 12 by passing through the leg sheath 24 of the top bracket 12 and the leg aperture 120 in the bottom plate 18 of the top bracket 12. The leg sleeve 60 is secured to the bottom bracket 34 by passing through the leg sheath 44 of the bottom bracket 34 and the leg aperture 122 in the bottom plate 40 of the bottom bracket 34. The connecting rod 52 is received into the leg sleeve 60.

Figure 10:
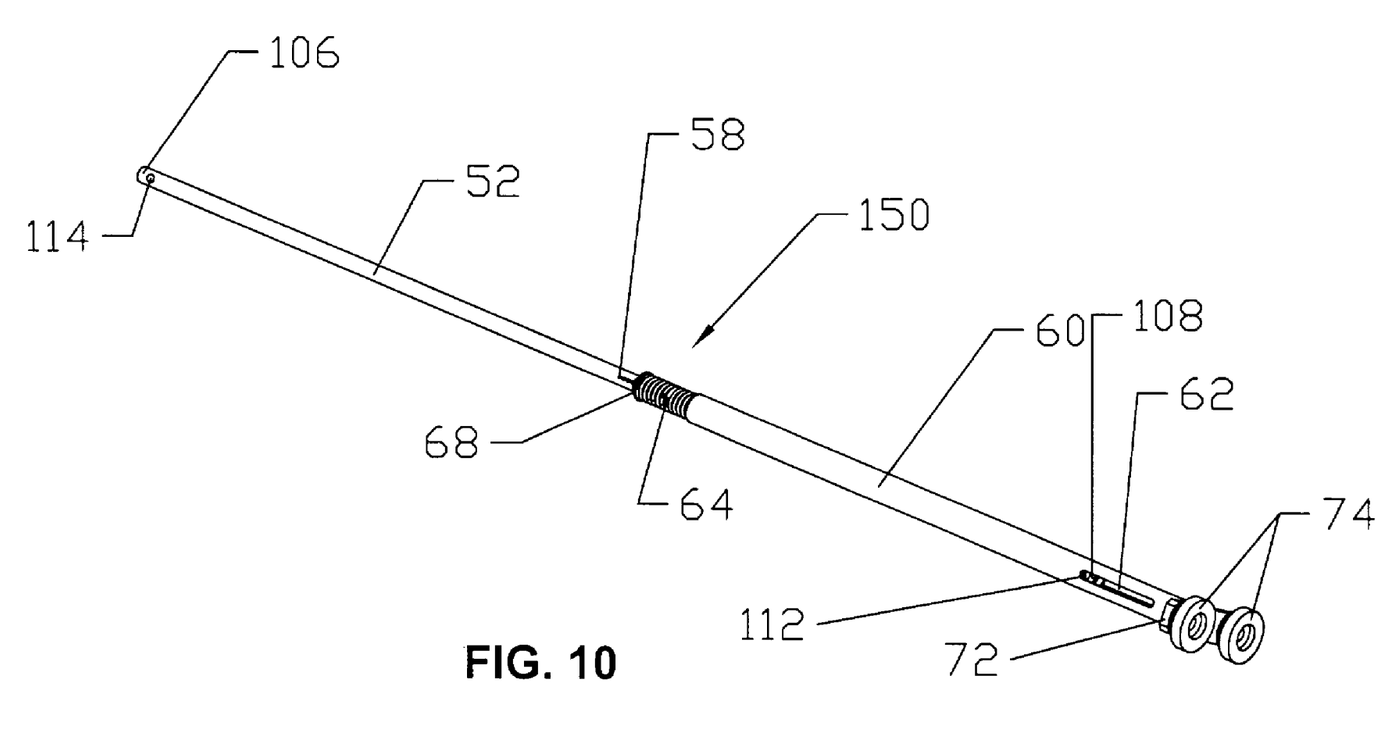
FIG. 10 is a perspective view of one embodiment of the leg of the present invention.
Figure 11:
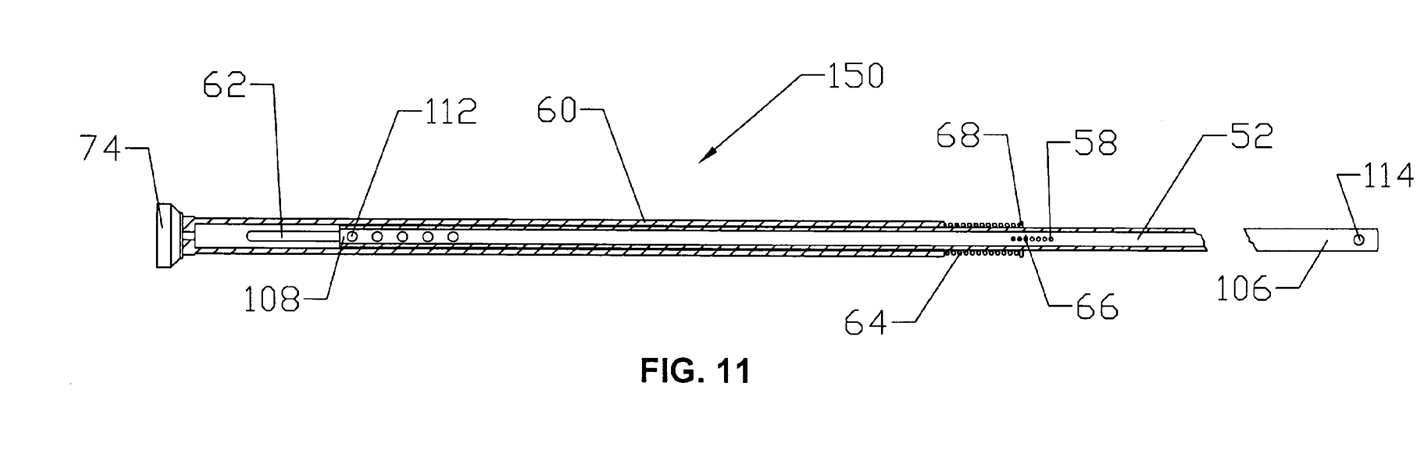
FIG. 11 is a partial cut-away side view of one embodiment of the leg of the present invention.

A compression spring 64 is fitted around the connecting rod 52, and a compression spring stopper 68 is positioned on the connecting rod 52, such that the compression spring 64 exerts pressure on the leg sleeve 60 and the compression spring stopper 68. The connecting rod 52 further contains numerous pin apertures 58, which allow for the compression spring stopper 68 to be placed in various positions. A pin 66, passing through a selected aperture 58, provides a positioning point for the compression spring stopper 68. The connecting rod 52 also contains a number of lifting bolt apertures 112 located near the bottom 108 of the connecting rod 52. The leg sleeve 60, in turn, contains access slots 62 near the bottom end 132. A lifting bolt 110 passes through a lifting bolt aperture 112 of the connecting rod 52 and the access slots 62 of the leg sleeve 60.

The top 106 of the connecting rod 52 is connected to the bottom 90 of the toggle plate 86 (FIG. 9). The connection suitably is done via a bolt 92 which passes through an aperture in the bottom 90 of the toggle plate 86 and an aperture 114 in the top 106 of the connecting rod 52. The top 88 of the toggle plate 86 is connected to one corner of the hinge plate 80 (FIGS. 6–8). The toggle plate 86 is suitably connected to the hinge plates 80 via a bolt 92 which passes through an aperture 84 in the hinge plate and an aperture in the top 88 of the toggle plate 86. Bolt 92 can, among other ways, be secured via a pin 96 and washer 94. Another corner of the hinge plate 80 is connected to the toggle joint 20 of the top bracket 12. The hinge plate 80 is suitably connected to the toggle joint 20 via a bolt which passes through the aperture 82 and an aperture in the toggle joint 20 and can be secured via a pin and washer, among other ways. A handle 78 is connected to one of the corners of the hinge plates 80.

A foot 70 comprising a base plate 72 and vibration minimizing pads 74 is attached to the bottom 108 of the leg sleeve 60. The vibration minimizing pads 74 suitably may be made of any rubber material.

As the handle 78 is rotated around the toggle joint 20, the toggle plate 86 exerts pressure downward or upward, depending on the rotation of the handle 78, on the connecting rod 52. If the rotation of the handle exerts pressure downward, the connecting rod 52 is forced downward and the compression spring stopper 68 of the connecting rod 52 applies pressure on the compression spring 64 which, in turn, applies downward pressure on the leg sleeve 60. The foot 70 of the leg sleeve 60 secures the brake 10 to the ground by friction force. When the handle is rotated causing upward pressure to be exerted on the toggle plate 86, the toggle plate 86 raises the connecting rod 52. The lifting bolt 110 attached to the connecting rod 52 raises the leg sleeve 60 at the point of contact of the top of the access slots 62 of the leg sleeve 60.

In another embodiment of the invention (FIG. 12), the leg of the brake comprises a first connecting rod 54, a second connecting rod 56 and a leg sleeve 60. The first connecting rod 54 is of a diameter smaller than the second connecting rod 56. The bottom 128 of the first connecting rod 54 is received by the top 130 of the second connecting rod 56 and is connected to the second connecting rod 52. The two rods may be connected in any standard fashion. Here they are connected by a set screw 134, which passes through set screw apertures in the first 54 and second 56 connecting rods. The second connecting rod 56 is received by the leg sleeve 60. The leg sleeve 60 is secured by passing through the leg sheath 44 of the bottom bracket 34 and the leg aperture 122 in the bottom plate 40 of the bottom bracket 34.

Figure 12:
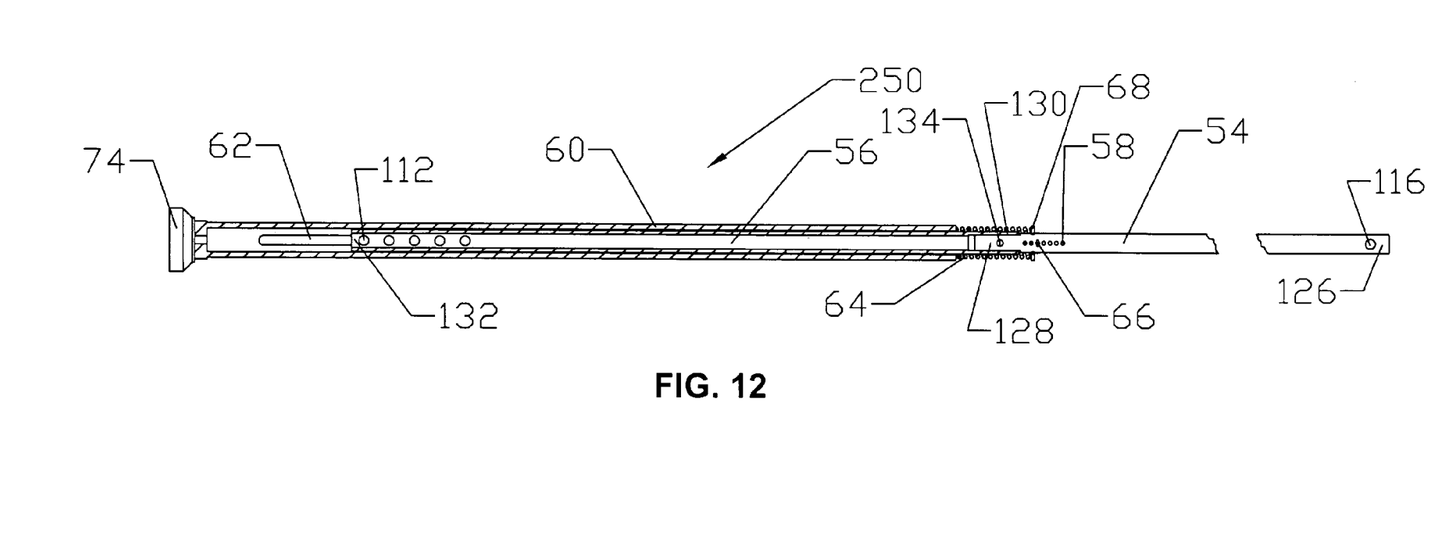
FIG. 12 is a partial cut-away side view of one embodiment of the leg of the present invention.

The first connecting rod 54 is secured by passing through the leg sheath 24 of the top bracket 12 and the leg aperture 120 in the bottom plate 18 of the top bracket 12.

A compression spring 64 is fitted around the first connecting rod 54, and a compression spring stopper 68 is positioned on the first connecting rod 54, such that the compression spring 64 exerts pressure on the leg sleeve 60 and the compression spring stopper 68. The first connecting rod 54 further contains numerous pin apertures 58, which allow for the compression spring stopper 68 to be placed in various positions. A pin 66, passing through a selected aperture 58, provides a positioning point for the compression spring stopper 68. The bottom 132 of the second connecting rod 56 contains a number of lifting bolt apertures 112. The leg sleeve 60 contains access apertures 62 near its bottom end 132. A lifting bolt passes through a lifting bolt aperture 112 of the second connecting rod 56 and the access slots 62 of the leg sleeve 60.

The top 126 of the first connecting rod 54 is connected to the bottom 90 of the toggle plate 86 (FIG. 9). The connection suitably is done via a bolt 92 which passes through an aperture in the bottom 90 of the toggle plate 86 and an aperture 114 in the top 106 of the connecting rod 52. The top 88 of the toggle plate 86 is connected to one corner of the hinge plate 80 (FIGS. 6–8). The toggle plate 86 is suitably connected to the hinge plates 80 via a bolt 92 which passes through an aperture 84 in the hinge plate and an aperture in the top 88 of the toggle plate 86. The bolt 92 can, among other ways, be secured via a pin 96 and washer 94. Another corner of the hinge plate 80 is connected to the toggle joint 20 of the top bracket 12. The hinge plate 80 is suitably connected to the toggle joint 20 via a bolt which passes through the aperture 82 and an aperture in the toggle joint 20 and can be secured via a pin and washer, among other ways. A handle 78 is connected to one of the corners of the hinge plates 80.

A foot 70, comprising a base plate 72 and vibration minimizing pads 74, is attached to the bottom 108 of the leg sleeve 60.

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

What is claimed is:

1. A portable brake comprising:
   a top bracket having a back plate, side plates, a toggle joint, and a leg sheath;
   a bottom bracket having a back plate, side plates, and a leg sheath;
   a leg comprising a connecting rod, having a top end and a bottom end and a leg sleeve:
   a toggle plate having a top and bottom end, wherein the bottom end of the toggle plate is connected to the top end of the connecting rod;
   wherein the leg further comprises a compression spring which surrounds a portion of the connecting rod, and wherein the connecting rod further contains a compression spring stopper, which is positioned such that the compression spring exerts pressure on the leg sleeve and the compression spring stopper;
   a pin, wherein the connecting rod further contains multiple pin apertures through which the pin can pass to allow for the variable positioning of the compression spring stopper;
   a pair of hinge plates, wherein each plate is connected to a handle, is connected at one corner to the toggle joint, and is connected at another corner to the top end of the toggle plate;
   and wherein the connecting rod passes through the top bracket leg sheath and the leg sleeve passes through the bottom bracket leg sheath, and wherein the bottom end of the connecting rod is received into the leg sleeve.

2. The portable brake of claim 1, wherein the leg sleeve further comprises access slots, and the connecting rod further contains at least one lifting bolt aperture.

3. The portable brake of claim 2 further comprising a lifting bolt which passes through the lifting bolt aperture of the connecting rod and the access slots of the leg sleeve.

4. A portable brake comprising
   a top bracket having a back plate, side plates, a toggle joint, and a leg sheath;
   a bottom bracket having a back plate, side plates, and a leg sheath;
   a leg comprising a first connecting rod having a top end and a bottom end, a second connecting rod having a top end and a bottom end, and a leg sleeve, wherein the bottom end of the first connecting rod is attached to the top end of the second connecting rod;
   a toggle plate having a top and bottom end, wherein the bottom end of the toggle plate is connected to the top end of the first connecting rod;
   a pair of hinge plates, wherein each plate is connected to a handle, is connected at one corner to the toggle joint, and is connected at another corner to the top end of the toggle plate; and
   wherein the first connecting rod passes through the top bracket leg sheath and the leg sleeve passes through the bottom bracket leg sheath, and wherein bottom end of the second connecting rod is received into the leg sleeve.

5. The portable brake of claim 4 wherein the leg further comprises a compression spring which surrounds a portion of the first connecting rod, and the first connecting rod further contains a compression spring stopper, which is positioned such that the compression spring exerts pressure on the leg sleeve and the compression spring stopper.

6. The portable brake of claim 5, further including a pin, wherein the first connecting rod further contains multiple pin apertures through which the pin can pass to allow for the variable positioning of the compression spring stopper.

7. The portable brake of claim 4, wherein the leg sleeve further includes access slots, and the second connecting rod further contains at least one lifting bolt aperture.

8. The portable brake of claim 7 further comprising a lifting bolt which passes through the lifting bolt aperture of the second connecting rod and the access slots of the leg sleeve.

9. The portable brake of claim 4, further including a foot comprising a base plate and at least one vibration minimizing pad attached to the base plate, wherein the base plate is attached to the leg sleeve.

10. The portable brake of claim 4, wherein the top bracket further comprises a bottom plate containing a leg aperture, wherein the first connecting rod passes through the top bracket leg aperture.

11. The portable brake of claim 4, wherein the bottom bracket further comprises a bottom plate containing a leg aperture, wherein the leg sleeve passes through the bottom bracket leg aperture.

12. The portable brake of claim 4, wherein the top bracket further includes a rung hook.

13. The portable brake of claim 4, wherein the bottom bracket further includes a rung hook.

14. A scaffold brake system comprising:
a scaffold end comprising multiple horizontal rungs;
a top bracket having a back plate, side plates, a toggle joint, a rung hook, and a leg sheath, wherein the back plate has at least one mounting aperture;
a bottom bracket having a back plate, side plates, a rung hook, and a leg sheath, wherein the back plate has at least one mounting aperture;
a leg comprising a connecting rod having a top end and a bottom end and a leg sleeve, wherein the connecting rod passes through the top bracket leg sheath and the leg sleeve passes through the bottom bracket leg sheath, and wherein the bottom end of the connecting rod is received into the leg sleeve;
a toggle plate having a top and bottom end, wherein the bottom end of the toggle plate is connected to the top end of the connecting rod;
a pair of hinge plates, wherein each plate is connected to a handle, is connected at one corner to the toggle joint, and is connected at another corner to the top end of the toggle plate;
wherein the top bracket is secured to the scaffold by the top bracket rung hook being positioned on a horizontal rung of the scaffold, and a top bracket mounting bolt securing the top bracket to another horizontal rung, wherein the top bracket mounting bolt passes through at least one top bracket mounting aperture; and
wherein the bottom bracket is secured to the scaffold by the bottom bracket rung hook being positioned on a horizontal rung of the scaffold, and a bottom bracket mounting bolt securing the bottom bracket to another horizontal rung, wherein the bottom bracket mounting bolt passes through at least one bottom bracket mounting aperture.

15. The scaffold brake system of claim 14, further including a foot comprising a base plate and at least one vibration minimizing pad attached to the base plate.

16. The scaffold brake system of claim 14, wherein the top bracket further comprises a bottom plate containing a leg aperture, wherein the connecting rod passes through the top bracket leg aperture.

17. The scaffold brake system of claim 14, wherein the bottom bracket further comprises a bottom plate containing a leg aperture, wherein the leg sleeve passes through the bottom bracket leg aperture.

18. The scaffold brake system of claim 14, wherein the leg sleeve further includes access slots, and the connecting rod further contains at least one lifting bolt aperture.

19. The scaffold brake system of claim 18 further comprising a lifting bolt which passes through the lifting bolt aperture of the connecting rod and the access slots of the leg sleeve.

* * * * *